(12) United States Patent
Terui et al.

(10) Patent No.: US 11,467,510 B2
(45) Date of Patent: *Oct. 11, 2022

(54) TONER

(71) Applicant: CANON KABUSHIKI KAISHA, Tokyo (JP)

(72) Inventors: Yuhei Terui, Numazu (JP); Yoshihiro Nakagawa, Numazu (JP); Junya Asaoka, Mishima (JP); Yuu Sasano, Susono (JP); Koki Inoue, Numazu (JP); Kenta Katayama, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/989,991

(22) Filed: Aug. 11, 2020

(65) Prior Publication Data
US 2021/0063901 A1    Mar. 4, 2021

(30) Foreign Application Priority Data

Aug. 29, 2019 (JP) .............................. JP2019-156504

(51) Int. Cl.
  *G03G 9/087* (2006.01)
  *G03G 9/08* (2006.01)
  *C08L 83/04* (2006.01)

(52) U.S. Cl.
  CPC ............ *G03G 9/0825* (2013.01); *C08L 83/04* (2013.01); *G03G 9/0821* (2013.01); *G03G 9/08711* (2013.01); *G03G 9/08773* (2013.01)

(58) Field of Classification Search
  CPC ............ G03G 9/08773; G03G 9/0825; G03G 9/0827; G03G 9/09725; G03G 9/0821;
(Continued)

(56) References Cited

U.S. PATENT DOCUMENTS 6,569,589 B2   5/2003  Inaba et al.
8,440,382 B2   5/2013  Isono et al.
(Continued)

FOREIGN PATENT DOCUMENTS

EP    1836536 B1 *  2/2013  ......... G03G 9/08791
JP    2006/184297    7/2006
(Continued)

OTHER PUBLICATIONS

"Machine Translation of publication # JP 2007133267 A" (Year: 2007).*

(Continued)

*Primary Examiner* — Peter L Vajda
*Assistant Examiner* — Boone Alexander Evans
(74) *Attorney, Agent, or Firm* — Venable LLP

(57) ABSTRACT

Provided is a toner containing a toner particle comprising a binder resin and an organosilicon polymer, wherein the organosilicon polymer contains an organosilicon polymer particle, the organosilicon polymer particle has a structure represented by the following formula (1):

$$R^1\text{—}SiO_{3/2} \quad (1)$$

in formula (1), $R^1$ is a $C_{1-4}$ alkyl group, and in cross-sectional observation of the toner particle by transmission electron microscopy, the organosilicon polymer particle is present in a region extending up to 80% of the distance A from the centroid out of the total distance A from the centroid of the toner particle cross-section to the contour of the cross-section, and the particle diameter of the organosilicon polymer particle is from 10 nm to 200 nm.

7 Claims, 1 Drawing Sheet

(58) Field of Classification Search
CPC .......... G03G 9/08706; G03G 9/09342; G03G 9/09328
See application file for complete search history.

(56) References Cited

U.S. PATENT DOCUMENTS

| | | | |
|---|---|---|---|
| 8,497,054 B2 | 7/2013 | Sugiyama et al. | |
| 8,603,712 B2 | 12/2013 | Aoki et al. | |
| 8,652,725 B2 | 2/2014 | Watanabe et al. | |
| 8,652,737 B2 | 2/2014 | Handa et al. | |
| 8,741,519 B2 | 6/2014 | Watanabe et al. | |
| 8,778,581 B2 | 7/2014 | Nonaka et al. | |
| 8,846,284 B2 | 9/2014 | Kinumatsu et al. | |
| 8,916,319 B2 | 12/2014 | Ikeda et al. | |
| 8,940,467 B2 | 1/2015 | Hashimoto et al. | |
| 9,229,345 B2 | 1/2016 | Ikeda et al. | |
| 9,341,967 B2 | 5/2016 | Tsujino et al. | |
| 9,366,981 B2 | 6/2016 | Yamawaki et al. | |
| 9,429,860 B2 | 8/2016 | Kinumatsu et al. | |
| 9,500,972 B2 | 11/2016 | Tanaka et al. | |
| 9,551,947 B2 | 1/2017 | Hiroko et al. | |
| 9,575,424 B2 | 2/2017 | Nakagawa et al. | |
| 9,632,441 B2 | 4/2017 | Abe et al. | |
| 9,658,549 B2 | 5/2017 | Tanaka et al. | |
| 9,658,551 B2 | 5/2017 | Terui et al. | |
| 9,785,071 B2 | 10/2017 | Shimano et al. | |
| 9,785,077 B2 | 10/2017 | Abe et al. | |
| 9,829,814 B2 | 11/2017 | Yoshida et al. | |
| 9,829,816 B2 | 11/2017 | Tanaka et al. | |
| 9,835,964 B2 | 12/2017 | Yoshida et al. | |
| 9,857,711 B2 | 1/2018 | Yoshida et al. | |
| 9,904,193 B2 | 2/2018 | Nakagawa et al. | |
| 9,958,801 B2 | 5/2018 | Tanaka et al. | |
| 9,964,879 B2 | 5/2018 | Terui et al. | |
| 10,012,922 B2 | 7/2018 | Yoshida et al. | |
| 10,078,279 B2 | 9/2018 | Nakagawa et al. | |
| 10,078,285 B2 | 9/2018 | Kubo et al. | |
| 10,101,681 B2 | 10/2018 | Tagawa et al. | |
| 10,295,922 B2 | 5/2019 | Terui et al. | |
| 10,416,582 B2 | 9/2019 | Nakagawa et al. | |
| 10,437,165 B2 | 10/2019 | Shimano et al. | |
| 10,678,155 B2 | 6/2020 | Terui et al. | |
| 10,747,133 B2 | 8/2020 | Yagi et al. | |
| 2010/0159375 A1* | 6/2010 | Zhou | G03G 9/08711 430/137.14 |
| 2013/0236825 A1* | 9/2013 | Sweeney | G03G 9/0821 430/108.11 |
| 2014/0186760 A1* | 7/2014 | Kawaguchi | G03G 9/08773 430/108.3 |
| 2015/0037727 A1* | 2/2015 | Fukudome | G03G 9/08755 430/109.3 |
| 2016/0349649 A1* | 12/2016 | Mochizuki | G03G 9/09321 |
| 2017/0329246 A1* | 11/2017 | Yamawaki | G03G 9/09307 |
| 2019/0235402 A1 | 8/2019 | Inoue et al. | |
| 2020/0041922 A1 | 2/2020 | Shimano et al. | |

FOREIGN PATENT DOCUMENTS

| | | | |
|---|---|---|---|
| JP | 2007133267 A * | 5/2007 | .......... G03G 9/0806 |
| JP | 2009/042386 | 2/2009 | |

OTHER PUBLICATIONS

Fedors, "A Method for Estimating Both the Solubility Parameters and Molar Volumes of Liquids", Polymer Engineering and Science, vol. 14, No. 2 (1974) 147-54.

\* cited by examiner

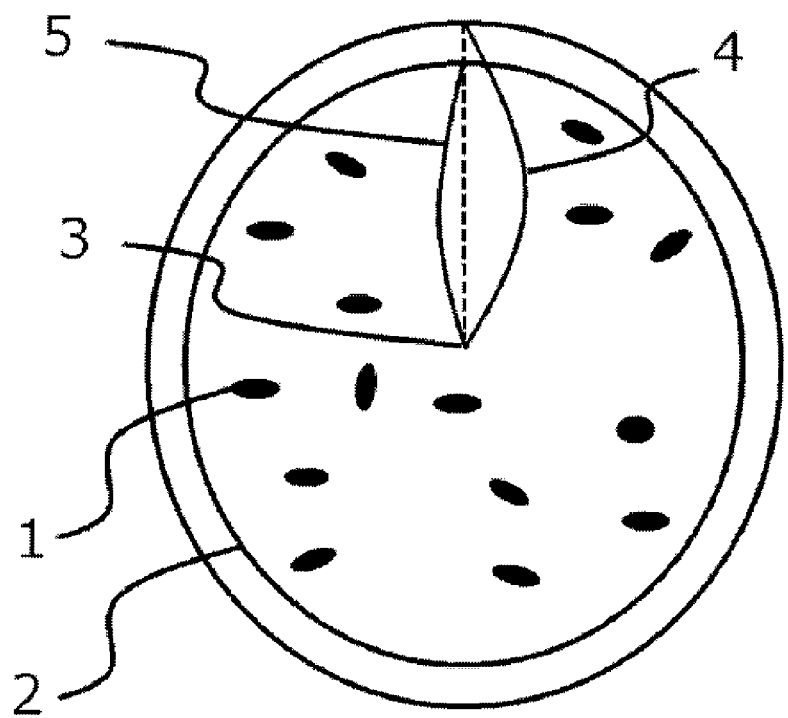

TONER

BACKGROUND OF THE INVENTION

Field of the Invention

The present invention relates to a toner for developing electrostatic latent images formed by methods such as electrophotographic methods, electrostatic recording methods and toner jet recording methods.

Description of the Related Art

In recent years energy saving has been considered a major technical issue for copiers, printers and fax machines, and large-scale reductions in the amount of heat used by the image fixing apparatus are desired. Thus, there is increasing demand for toners with so-called "low temperature fixability", which allows images to be fixed with less energy.

A common method for improving the low temperature fixability of a toner is to soften the binder resin by lowering the glass transition temperature (Tg). However, in methods which improve the low temperature fixability by lowering the viscosity of the binder resin during fixing, offset due to insufficient release from the fixing member, cracks and chips in the toner particle due to reduced toner strength, and melt adhesion of the toner to the developing member are likely.

To increase toner strength without changing the glass transition temperature (Tg), it is common to increase the molecular weight of the binder resin or give the binder resin a crosslinked structure. With these methods alone, however, the low temperature fixability inevitably declines if the toner strength is increased beyond a certain level.

For example, Japanese Patent Application Publication No. 2006-184297 discloses a method for adding an inorganic fine particle to a toner particle to achieve charge stabilization in addition to the conventional filler effect while at the same time conferring flowability and suppressing burial of the external additive because the inorganic fine particle is exposed on the surface of the toner particle.

Meanwhile, Japanese Patent Application Publication No. 2009-42386 discloses a method for increasing toner strength by adding pearl necklace-type silica.

SUMMARY OF THE INVENTION

Although long-term stabilization of image quality can be achieved with Japanese Patent Application Publication No. 2006-184297, however, it has been found that the low temperature fixability of the toner is adversely affected because the filler effect increases as the added amount of the inorganic fine particle is increased.

With Japanese Patent Application Publication No. 2009-42386, on the other hand, although the toner strength is increased more than with conventional silica, it has been found that the low temperature fixability also declines when enough is added to obtain a satisfactory effect.

The present invention provides a toner whereby a decrease in low temperature fixability due to addition of a filler can be suppressed while at the same time the excellent anti-cracking effect of the filler is obtained.

This is a toner having a toner particle containing a binder resin and an organosilicon polymer, wherein
the organosilicon polymer comprises an organosilicon polymer particle,
the organosilicon polymer particle has a structure represented by the following formula (1):

$$R^1-SiO_{3/2} \quad (1)$$

in formula (1), $R^1$ is a $C_{1-4}$ alkyl group, and in cross-sectional observation of the toner particle by transmission electron microscopy, the organosilicon polymer particle is present in a region extending up to 80% of the distance A from the centroid out of the total distance A from the centroid of the toner particle cross-section to the contour of the cross-section, and
the particle diameter of the organosilicon polymer particle is from 10 nm to 200 nm.

With the present invention, it is possible to obtain a toner whereby an excellent anti-cracking effect can be achieved with a filler while preventing a decline in low temperature fixability due to addition of the filler.

Further features of the present invention will become apparent from the following description of exemplary embodiments with reference to the attached drawing.

BRIEF DESCRIPTION OF THE DRAWINGS

The FIGURE is a model view showing the condition of an organosilicon polymer particle in a toner.

DESCRIPTION OF THE EMBODIMENTS

Unless otherwise specified, descriptions of numerical ranges such as "from XX to YY" or "XX to YY" include the numbers at the lower and upper limits of the range.

When numerical ranges are described in stages, the upper and lower limits of each numerical range can be combined arbitrarily.

The toner of the invention is a toner having a toner particle containing a binder resin and an organosilicon polymer, wherein
the organosilicon polymer comprises an organosilicon polymer particle,
the organosilicon polymer particle has a structure represented by the following formula (1):

$$R^1-SiO_{3/2} \quad (1)$$

in formula (1), $R^1$ is a $C_{1-4}$ alkyl group, and
in cross-sectional observation of the toner particle by transmission electron microscopy, the organosilicon polymer particle is present in a region extending up to 80% of the distance A from the centroid out of the total distance A from the centroid of the toner particle cross-section to the contour of the cross-section, and
the particle diameter of the organosilicon polymer particle is from 10 nm to 200 nm.

The symbols used in the FIGURE are defined as follows:
1: organosilicon polymer, 2: boundary line showing region extending up to 80% of the distance A from the centroid out of the total distance A from the centroid of the toner particle cross-section to the contour of the cross-section, 3: centroid of toner particle cross-section, 4: distance A from centroid of toner particle cross-section to contour of cross-section, 5: distance of 80% of distance A from centroid of toner particle cross-section.

That is, both low temperature fixability and suppression of toner particle cracking from long-term use can be achieved by including an organosilicon polymer particle in the interior of the toner particle.

This is attributed to the effect of the alkyl groups represented by $R^1$ in the structure of the organosilicon polymer particle. That is, it is thought that because affinity between the organosilicon polymer particle and the binder resin of the toner particle is increased by the presence of alkyl groups, an excellent anti-cracking effect can be achieved with little effect on low temperature fixability.

Consequently, when the carbon number of $R^1$ in the structure of the organosilicon polymer particle is 1 to 4, it is possible to obtain a toner particle that achieves an anti-cracking effect due to the excellent filler effect even if the added amount is small, with very little effect on low temperature fixability.

If $R^1$ in formula (1) is not an alkyl group, on the other hand, it is difficult to achieve a filler effect due to the poor affinity with the binder resin, and an anti-cracking effect is difficult to achieve. If the carbon number of $R^1$ is more than 4, there is a danger that low temperature fixability will decline because affinity with the binder resin is too high.

As shown in the FIGURE, the organosilicon polymer particle is considered to be enveloped in the toner particle when organosilicon polymer particles are present in a region extending up to 80% of the distance A from the centroid out of the total distance A from the centroid of the toner particle cross-section to the contour of the cross-section. The organosilicon polymer particle may be dispersed in the toner particle interior and may also be present on the toner particle surface. Preferably the organosilicon polymer is present on the toner particle surface in addition to the organosilicon polymer particles in the toner particle interior.

If the organosilicon polymer particle is present in the region extending up to 80% of the distance A, its effect as a filler can be imparted to the toner particle as a whole because it is sufficiently removed from the toner particle surface.

To ensure that the organosilicon polymer particle is present in the region extending up to 80% of the distance A from the centroid, the location of the particles can be controlled at will by adjusting the dispersal time, dispersal strength, amount of the organosilicon polymer particle and the like when the organosilicon polymer particle is mixed with a polymerizable monomer, pigment and the like to obtain a polymerizable monomer composition.

Furthermore, low temperature fixability tends to decline when the particle diameter of the organosilicon polymer particle is too small, while the anti-cracking effect tends to decline if the particle diameter is too large. Thus, the number-average particle diameter of the organosilicon polymer particle must be from 10 nm to 200 nm. It is thought that within this range, a particularly excellent filler effect can be obtained.

The number-average particle diameter is preferably from 15 nm to 180 nm, or more preferably from 40 nm to 120 nm.

The organosilicon polymer particle has a structure represented by formula (1) below:

in which $R^1$ in formula (1) is a $C_{1-4}$ alkyl group.

In an organosilicon polymer having the structure of formula (1), one of the four valence electrons of the Si atom binds to $R^1$, while the other three bind to O atoms. Both of the valence electrons of each O atom bind to Si, forming a siloxane structure (Si—O—Si). Considering the Si atoms and O atoms of the organosilicon polymer, because there are three O atoms per two Si atoms, this is represented as —SiO$_{3/2}$. It is thought that the —SiO$_{3/2}$ structure of this organosilicon polymer has properties similar to those of silica (SiO$_2$) composed of many siloxane bonds.

In the structure represented by formula (1), $R^1$ is a $C_{1-4}$ alkyl group, or more preferably a $C_{1-3}$ alkyl group, or still more preferably a $C_{1-2}$ alkyl group.

Methyl, ethyl and propyl groups are preferred examples of $C_{1-3}$ alkyl groups. A methyl group is especially desirable as $R^1$.

The organosilicon polymer particle (organosilicon polymer) is preferably a condensation polymer of a compound containing an organosilicon compound having a structure represented by formula (Z) below:

In formula (Z), $R_1$ represents a $C_{1-4}$ alkyl group, and each of $R_2$, $R_3$ and $R_4$ independently represents a halogen atom, hydroxy group, acetoxy group or (preferably $C_{1-4}$ or more preferably $C_{1-3}$) alkoxy group.

$R_1$ is preferably a $C_{1-3}$ alkyl group, or more preferably a methyl group. $R_2$, $R_3$ and $R_4$ are also called reactive groups.

These reactive groups form crosslinked structures by hydrolysis, addition polymerization and condensation polymerization. From the standpoint of gentle hydrolyzability at room temperature and considering the precipitation properties of the organosilicon polymer, these are preferably $C_{1-3}$ alkoxy groups, and more preferably methoxy or ethoxy groups.

Hydrolysis, addition polymerization and condensation polymerization of $R_2$, $R_3$ and $R_4$ can be controlled by controlling the reaction temperature, reaction time, reaction solvent and pH. One kind of organosilicon compound having three reactive groups ($R_2$, $R_3$ and $R_4$) in the molecule apart from $R_1$ in formula (Z) above (hereunder also called a trifunctional silane) may be used to obtain the organosilicon polymer, or a combination of multiple kinds may be used.

The following are examples of the compound represented by formula (Z) above: trifunctional methyl silanes such as methyl trimethoxysilane, methyl triethoxysilane, methyl diethoxymethoxysilane, methyl ethoxydimethoxysilane, methyl trichlorosilane, methyl methoxydichlorosilane, methyl ethoxydichlorosilane, methyl dimethoxychlorosilane, methyl methoxyethoxychlorosilane, methyl diethoxychlorosilane, methyl triacetoxysilane, methyl diacetoxymethoxysilane, methyl diacetoxyethoxysilane, methyl acetoxydimethoxysilane, methyl acetoxymethoxyethoxysilane, methyl acetoxydiethoxysilane, methyl trihydroxysilane, methyl methoxydihydroxysilane, methyl ethoxydihydroxysilane, methyl dimethoxyhydroxysilane, methyl ethoxymethoxyhydroxysilane, and methyl diethoxyhydroxysilane; and trifunctional silanes such as ethyl trimethoxysilane, ethyl triethoxysilane, ethyl trichlorosilane, ethyl triacetoxysilane, ethyl trihydroxysilane, propyl trimethoxysilane, propyl triethoxysilane, propyl trichlorosilane, propyl triacetoxysilane, propyl trihydroxysilane, butyl trimethoxysilane, butyl triethoxysilane, butyl trichlorosilane, butyl triacetoxysilane and butyl trihydroxysilane.

An organosilicon polymer particle obtained by combining any of the following with an organosilicon polymer having the structure represented by formula (Z) may also be used to the extent that this does not detract from the effects of the invention: an organosilicon compound having four reactive groups in the molecule (tetrafunctional silane), an organosilicon compound having three reactive groups in the molecule (trifunctional silane), an organosilicon compound having two reactive groups in the molecule (bifunctional silane) or an organosilicon compound having one functional group (monofunctional silane). An organosilicon compound having an unsaturated bond in the molecule (vinyl silane) may also be used. Examples include the following:

Tetrafunctional silanes such as tetraethoxysilane; trifunctional silanes such as hexyl trimethoxysilane, hexyl triethoxysilane, hexyl trichlorosilane, hexyl triacetoxysilane, hexyl trihydroxysilane, phenyl trimethoxysilane, phenyl triethoxysilane, phenyl trichlorosilane, phenyl triacetoxysilane, phenyl trihydroxysilane, 3-aminopropyl trimethoxysilane, 3-aminopropyl triethoxysilane, 3-(2-aminoethyl) aminopropyl trimethoxysilane and 3-(2-aminoethyl) aminopropyl triethoxysilane; bifunctional silanes such as dimethyl diethoxysilane and hexamethyl disilazane; and trifunctional silanes such as vinyl triisocyanatosilane, vinyl trimethoxysilane, vinyl triethoxysilane, vinyl diethoxymethoxysilane, vinyl ethoxydimethoxysilane, vinyl ethoxydihydroxysilane, vinyl dimethoxyhydroxysilane, vinyl ethoxymethoxyhydroxysilane and vinyl diethoxyhydroxysilane.

The content of the organosilicon polymer in the toner particle is preferably from 0.05 mass % to 5.00 mass %, or more preferably from 0.15 mass % to 4.50 mass %. An excellent anti-cracking effect can be achieved by including at least 0.05 mass % of the organosilicon polymer. If the amount is not more than 5.00 mass %, more excellent low temperature fixability is obtained.

The content of the organosilicon polymer particle in the toner particle is preferably from 0.05 mass % to 1.50 mass %.

When the toner particle has the organosilicon polymer on its surface, considering the toner base particle to be the particle excluding the organosilicon polymer on the toner particle surface, the content of the organosilicon polymer particle in the toner base particle is preferably from 0.05 mass % to 1.50 mass %.

Within this range, extremely good low temperature fixability is obtained along with an especially good anti-cracking effect with the toner base particle.

When the toner particle has the organosilicon polymer on its surface, moreover, the content of the organosilicon polymer on the toner particle surface is preferably from 1.00 mass % to 4.50 mass %, or more preferably from 1.50 mass % to 3.50 mass %.

In $^{29}$Si-NMR measurement of the tetrahydrofuran (THF)-insoluble component of the toner particle, the ratio ST3 of the peak area of the structure represented by formula (T3) below to the total peak area of the organosilicon polymer is preferably from 0.60 to 0.90, or more preferably from 0.70 to 0.85:

$$R^2\text{—}SiO_{3/2} \tag{T3}$$

(in formula (T3), $R^2$ represents a $C_{1-4}$ alkyl group).

If "ST3" is from 0.60 to 0.90, the organosilicon polymer is condensed to a sufficient degree, and an even greater anti-cracking effect is obtained. The ST3 can be controlled by adjusting the time, temperature and pH in the reaction for forming the organosilicon polymer from the organosilicon compound after the organosilicon compound is added.

Given SPb as the SP value of the binder resin and SPs as the SP value of the organosilicon polymer particle, an anti-cracking effect due to the excellent filler effect can be obtained even with a small added amount if formula (2) below is satisfied. There is no particular lower limit to |SPb−SPs|, but preferably it is at least 0.0.

$$|SPb\text{−}SPs|\leq 1.0 \tag{2}$$

If formula (2) is satisfied, this indicates a high affinity between the binder resin and the organosilicon polymer particle. This is easily compatible with low temperature fixability because the filler effect can be obtained even if only a very small amount of the organosilicon polymer particle is added.

The solubility parameter (SP value) is a parameter that indicates that two substances are more compatible if their SP values are similar. The SP value can be calculated by the commonly used Fedors method (Poly. Eng. Sci., 14(2), 147 (1974)) from the types and molar ratios of the component monomers.

The SP value is given in units of $(cal/cm^3)^{1/2}$ but can also be converted to units of $(J/m^3)^{1/2}$ using the formula 1 $(cal/cm^3)^{1/2}=2.046\times 10^3 (J/m^3)^{1/2}$.

The binder resin is not particularly limited, and a known one may be used. The binder resin preferably contains a styrene-acrylic copolymer.

A styrene-acrylic copolymer is a copolymer of a styrene monomer and an acrylic monomer (acrylic acid, methacrylic acid or an alkyl ester of these).

The styrene-acrylic copolymer here may be contained in the binder resin in the form of the styrene-acrylic copolymer by itself, or it may be contained in the binder resin in the form of a block copolymer or graft copolymer with another polymer or the like, or a mixture of these.

The content of the styrene-acrylic copolymer in the binder resin is preferably at least 50 mass %, or more preferably from 80 mass % to 100 mass %.

The developing characteristics and durability of the toner are improved because the binder resin contains a styrene-acrylic copolymer.

A known resin or polymer used in toners may also be used in the binder resin in addition to the styrene-acrylic copolymer.

Examples of styrene monomers include styrene, α-methylstyrene, β-methylstyrene, o-methyl styrene, m-methyl styrene, p-methyl styrene, 2,4-dimethylstyrene, divinyl benzene and the like.

One kind of styrene monomer may be used, or a combination of two or more kinds selected from these may be used.

Examples of acrylic monomers include acrylic acid alkyl ethers such as methyl acrylate, ethyl acrylate, n-propyl acrylate, isopropyl acrylate, n-butyl acrylate, isobutyl acrylate, tert-butyl acrylate, n-amyl acrylate, n-hexyl acrylate, 2-ethylhexyl acrylate, n-octyl acrylate, n-nonyl acrylate, n-decyl acrylate and n-dodecyl acrylate;

methacrylic acid alkyl esters such as methyl methacrylate, ethyl methacrylate, n-propyl methacrylate, isopropyl methacrylate, n-butyl methacrylate, isobutyl methacrylate, tert-butyl methacrylate, n-amyl methacrylate, n-hexyl methacrylate, 2-ethylhexyl methacrylate, n-octyl methacrylate, n-nonyl methacrylate, n-decyl methacrylate and n-dodecyl methacrylate;

acrylic acid diesters such as diethylene glycol diacrylate, triethylene glycol diacrylate, tetraethylene glycol diacrylate, polyethylene glycol diacrylate and 1,6-hexanediol diacrylate; and acrylic acid, methacrylic acid and the like.

One kind of acrylic monomer may be used, or a combination of two or more kinds selected from these may be used.

The glass transition temperature (Tg) of the binder resin may be kept within the desired range by adjusting the polymerization ratios of the styrene monomer and acrylic monomer.

Specifically, the polymerization ratio of the styrene monomer and acrylic monomer (styrene monomer:acrylic monomer) is preferably from 65:35 to 100:0, or more preferably from 70:30 to 85:15 based on mass.

The glass transition temperature (Tg) of the binder resin is preferably from 25° C. to 65° C.

A polymerization initiator may also be used for polymerizing the binder resin when the toner particle is manufactured. Various polymerization initiators such as peroxide polymerization initiators and azo polymerization initiators may be used.

Examples of organic peroxide polymerization initiators include peroxy esters, peroxy dicarbonates, dialkyl peroxides, peroxy ketals, ketone peroxides, hydroperoxides and diacyl peroxides.

Specific examples include peroxy esters such as t-butyl peroxyacetate, t-butyl peroxypivalate, t-butyl peroxyisobutyrate, t-hexyl peroxyacetate, t-hexyl peroxypivalate, t-hexyl peroxyisobutyrate, t-butyl peroxyisopropyl monocarbonate, and t-butyl peroxy-2-ethylhexyl monocarbonate;

diacyl peroxides such as benzoyl peroxide; peroxy dicarbonates such as diisopropyl peroxydicarbonate; peroxy ketals such as 1,1-di-t-hexyl peroxycyclohexane; dialkyl peroxides such as di-t-butyl peroxide; and t-butyl peroxyallyl monocarbonate and the like.

Methyl ethyl ketone peroxide, diisopropyl oxycarbonate, cumene hydroperoxide, 2,4-dichlorobenzoyl peroxide, lauroyl peroxide and the like may also be used.

Examples of inorganic peroxide polymerization initiators include persulfate salts, hydrogen peroxide and the like.

Examples of azo polymerization initiators include 2,2'-azobis-(2,4-divaleronitrile), 2,2'-azobis-(2,4-dimethylvaleronitrile), 2,2'-azobisisobutyronitrile, 1,1'-azobis-(cyclohexane-1-carbonitrile), 2,2'-azobis-4-methoxy-2,4-dimethylvaleronitrile, azobisisobutyronitrile, dimethyl-2,2'-azobis-(2-methylpropionate) and the like.

Two or more of these polymerization initiators may also be used simultaneously as necessary.

The amount of the polymerization initiator used is preferably from 0.10 to 20.0 mass parts per 100.0 mass parts of the polymerizable monomers.

The toner particle preferably has an organosilicon polymer on the toner particle surface.

The toner particle preferably has on its surface an organosilicon polymer having the structure represented by formula (3) below:

$$R^3—SiO_{3/2} \quad (3)$$

In formula (3), $R^3$ is a $C_{1-4}$ alkyl group. Preferably it is a $C_{1-3}$ alkyl group, or more preferably a $C_{1-2}$ alkyl group, or especially a methyl group.

Including an organosilicon polymer on the toner particle surface is desirable because it greatly enhances the anti-cracking effect and can thus greatly improve long-term stability.

The toner particle may also contain a polar resin.

Examples of polar resins include polyester resins.

When a polyester resin is used as a polar resin, the inherent lubricity of the polar resin can be expected when this resin is localized to form a shell on the surface of the toner particle.

The polyester resin may be a condensation polymer of an alcohol monomer and a carboxylic acid monomer.

Examples of alcohol monomers include bisphenol A alkylene oxide adducts such as polyoxypropylene (2.2)-2, 2-bis(4-hydroxyphenyl) propane, polyoxypropylene (3.3)-2, 2-bis(4-hydroxyphenyl) propane, polyoxyethylene (2.0)-2, 2-bis(4-hydroxyphenyl) propane, polyoxypropylene (2.0)-polyoxyethylene (2.0)-2,2-bis(4-hydroxyphenyl) propane and polyoxypropylene (6)-2,2-bis(4-hydroxyphenyl) propane; and ethylene glycol, diethylene glycol, triethylene glycol, 1,2-propanediol, 1,3-propanediol, 1,4-butanediol, neopentyl glycol, 1,4-butenediol, 1,5-pentanediol, 1,6-hexanediol, 1,4-cyclohexane dimethanol, dipropylene glycol, polyethylene glycol, polypropylene glycol, polytetramethylene glycol, bisphenol A, hydrogenated bisphenol A, sorbitol, 1,2,3,6-hexanetetrol, 1,4-sorbitan, pentaerythritol, dipentaerythritol, tripentaerythritol, 1,2,4-butanetriol, 1,2,5-pentanetriol, glycerol, 2-methylpropanetriol, 2-methyl-1,2,4-butanetriol, trimethylol ethane, trimethylol propane and 1,3,5-trihydroxymethyl benzene.

Examples of carboxylic acid monomers include aromatic dicarboxylic acids such as phthalic acid, isophthalic acid and terephthalic acid, and their anhydrides; alkyldicarboxylic acids such as succinic acid, adipic acid, sebacic acid and azelaic acid, and their anhydrides; succinic acid substituted with $C_{6-18}$ alkyl or alkenyl groups, and anhydrides thereof; and unsaturated dicarboxylic acids such as fumaric acid, maleic acid and citraconic acid, and their anhydrides.

The following monomers may also be used: polyhydric alcohols such as sorbitol, sorbitan, and Novolac phenolic resin oxyalkylene ether; and polycarboxylic acids such as trimellitic acid, pyromellitic acid and benzophenone tetracarboxylic acid, and their anhydrides.

Of these, a condensation polymer of a bisphenol derivative represented by formula (I) below with a divalent or higher carboxylic acid is desirable for obtaining good charging characteristics.

Examples of divalent or higher carboxylic acids include fumaric acid, maleic acid, phthalic acid, terephthalic acid, trimellitic acid and pyromellitic acid and their acid anhydrides, and lower alkyl esters of these.

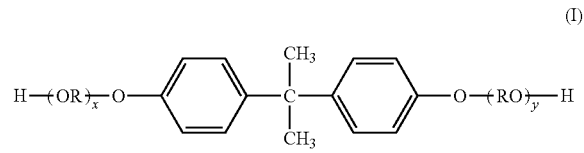

(I)

(In the formula, R represents an ethylene or propylene group, each of x and y is 1 or an integer greater than 1, and the average value of x+y is from 2 to 10.)

The content of the polar resin is preferably from 1.0 to 20.0 mass parts, or more preferably from 2.0 to 10.0 mass parts per 100.0 mass parts of the binder resin or the polymerizable monomers for producing the binder resin.

The methods for manufacturing the organosilicon polymer and organosilicon polymer particle are explained next.

The organosilicon polymer particle can be manufactured by a conventional known sol-gel method or the like.

For example, the temperature of pH-adjusted pure water is controlled as the aforementioned organosilicon compound is added and hydrolyzed in a temperature controllable container equipped with a stirrer. A polycondensation reaction is then produced by re-adjusting the temperature and pH to values suitable for polycondensation, and the organosilicon compound is precipitated to obtain an organosilicon polymer.

The pH for hydrolysis is preferably from 1.0 to 7.0, while the pH for polycondensation is preferably from 5.0 to 12.0. Because condensation polymerization progresses differently depending on the pH, the pH is controlled to obtain the target organosilicon polymer. For example, polycondensation progresses less easily the closer the pH value is to 5.0 and more easily the closer the pH is to 12.0.

The temperature for hydrolysis is preferably not more than 50° C., while the polycondensation temperature is adjusted depending on the temperature of the desired organosilicon polymer. Because a higher temperature results in more rapid polycondensation, it tends to yield small particles, while a lower temperature tends to yield larger particles.

Toner manufacturing methods are explained below, but the method is not limited to these.

A conventional known manufacturing method may be adopted as the toner particle manufacturing method.

Melt kneading pulverization methods, dissolution suspension methods and suspension polymerization methods are especially desirable. These manufacturing methods are desirable because the toner particle is obtained by uniformly mixing the raw materials in the manufacturing process, which allows the organic polymer particles to be uniformly dispersed.

To obtain a toner particle having on its surface an organosilicon compound with the structure represented by formula (3), the toner particle is preferably manufactured in an aqueous medium. A suspension polymerization method or dissolution suspension method is preferred, and a suspension polymerization method is especially desirable. In suspension polymerization it is easy to deposit the organosilicon polymer uniformly on the toner particle surface, and durability is good because the adhesiveness between the surface layer and interior of the toner particle is excellent. A suspension polymerization method is explained further below.

The suspension polymerization method comprises a granulation step in which particles of a polymerizable monomer composition containing a polymerizable monomer for forming a binder resin, an organosilicon polymer and a colorant and other additives as necessary are formed in an aqueous medium, and a polymerization step in which the polymerizable monomer contained in the polymerizable monomer composition is polymerized to form toner particles after the granulation step.

The added organosilicon polymer may be in the form of an organosilicon polymer particle or a resin particle having an organosilicon polymer on its surface or the like.

A release agent or another resin may also be added to the polymerizable monomer composition as necessary. After completion of the polymerization step, the resulting particle may be washed, collected by filtration and dried to obtain a toner particle. The temperature may also be raised during the second half of the polymerization step. A part of the dispersion medium may also be distilled off from the reaction system during the second half of the polymerization step or after completion of the polymerization step in order to remove unreacted polymerizable monomers or by-products.

The following methods may be used for example to obtain a toner particle having on its surface an organosilicon polymer having the structure represented by formula (3).

One method is to first obtain a toner base particle, add the toner base particle to an aqueous medium, and form a surface layer of the organosilicon polymer on the toner base particle in the aqueous medium. When the toner base particle has been manufactured in an aqueous medium, the aqueous medium containing the resulting toner base particle may be used as is.

The surface layer of the organosilicon polymer may be formed by known methods, and preferably hydrolysis and polycondensation reactions are performed as described above.

Examples of the release agent include petroleum waxes such as paraffin wax, microcrystalline wax and petrolatum, and their derivatives, montan wax and its derivatives, hydrocarbon waxes produced by the Fischer-Tropsch method, and their derivatives, polyolefin waxes such as polyethylene and polypropylene, and their derivatives, natural waxes such as carnauba wax and candelilla wax, and their derivatives, higher fatty alcohols, fatty acids such as stearic acid and palmitic acid, compounds of these such as acid amides, esters and ketones, hydrogenated castor oil and its derivatives, vegetable waxes, animal waxes, and silicone resin.

Derivatives here include oxides, block copolymers with vinyl monomers, and graft modified products. One of these or a mixture of multiple kinds may be used.

The content of the release agent is preferably from 1 to 20 mass parts per 100 mass parts of the binder resin.

Examples of the other resin above include the following: monopolymers of styrene and substituted styrene, such as polystyrene and polyvinyl toluene; styrene copolymers such as styrene-propylene copolymer, styrene-vinyl toluene copolymer, styrene-vinyl naphthalene copolymer, styrene-methyl acrylate copolymer, styrene-ethyl acrylate copolymer, styrene-butyl acrylate copolymer, styrene-octyl acrylate copolymer, styrene-dimethylaminoethyl acrylate copolymer, styrene-methyl methacrylate copolymer, styrene-ethyl methacrylate copolymer, styrene-butyl methacrylate copolymer, styrene-dimethylaminoethyl methacrylate copolymer, styrene-vinyl methyl ether copolymer, styrene-vinyl ethyl ether copolymer, styrene-vinyl methyl ketone copolymer, styrene-butadiene copolymer, styrene-isoprene copolymer, styrene-maleic acid copolymer and styrene-maleic acid ester copolymer; and polymethyl methacrylate, polybutyl methacrylate, polyvinyl acetate, polyethylene, polypropylene, polyvinyl butyral, silicone resin, polyester resin, polyamide resin, epoxy resin, polyacrylic resin, rosin, modified rosin, terpene resin, phenol resin, aliphatic or alicyclic hydrocarbon resins and aromatic petroleum resin, and one of these alone or a mixture of multiple kinds may be used.

The styrene monomers and acrylic monomers listed above may be used as polymerizable monomers in suspension polymerization.

The following vinyl polymerizable monomers may also be used in combination: methylene aliphatic monocarboxylic acid esters; vinyl esters such as vinyl acetate, vinyl propionate, vinyl benzoate, vinyl butyrate and vinyl formate; vinyl ethers such as vinyl methyl ether, vinyl ethyl ether and vinyl isobutyl ether; and vinyl methyl ketone, vinyl hexyl ketone and vinyl isopropyl ketone.

A chain transfer agent may also be added when polymerizing the polymerizable monomer in order to control the molecular weight of the binder resin constituting the toner particle. The added amount thereof is preferably from 0.001 to 15.000 mass parts per 100 mass parts of the polymerizable monomer.

A crosslinking agent may also be added when polymerizing the polymerizable monomer in order to control the molecular weight of the binder resin constituting the toner particle.

Examples of crosslinking agents include divinyl benzene, bis(4-acryloxypolyethoxyphenyl), propane, ethylene glycol diacrylate, 1,3-butylene glycol diacrylate, 1,4-butanediol diacrylate, 1,5-pentanediol diacrylate, 1,6-hexanediol diacrylate, neopentyl glycol diacrylate, diethylene glycol diacrylate, triethylene glycol diacrylate, tetraethylene glycol diacrylate, diacrylates of polyethylene glycol #200, #400 and #600, dipropylene glycol diacrylate, polypropylene glycol diacrylate, polyester diacrylate (MANDA, Nippon Kayaku Co., Ltd.), and the above acrylates converted to methacrylates.

Examples of polyfunctional crosslinking agents include pentaerythritol triacrylate, trimethylolethane triacrylate, trimethylolpropane triacrylate, tetramethylolmethane tetraacrylate, oligoester acrylates and their methacrylates, 2,2-bis(4-methacryloxy-polyethoxyphenyl) propane, diacrylic phthalate, triallyl cyanurate, triallyl isocyanurate, triallyl trimellitate and diaryl chlorendate. The added amount thereof is preferably from 0.001 to 15.000 mass parts per 100 mass parts of the polymerizable monomer.

When the medium used in such suspension polymerization is an aqueous medium, the following may be used as dispersion stabilizers for the particles of the polymerizable monomer composition: tricalcium phosphate, magnesium phosphate, zinc phosphate, aluminum phosphate, calcium carbonate, magnesium carbonate, calcium hydroxide, magnesium hydroxide, aluminum hydroxide, calcium metasilicate, calcium sulfate, barium sulfate, bentonite, silica and alumina.

Examples of organic dispersants include polyvinyl alcohol, gelatin, methyl cellulose, methyl hydroxypropyl cellulose, ethyl cellulose, carboxymethyl cellulose sodium salt, and starch.

A commercial nonionic, anionic or cationic surfactant may also be used. Examples of such surfactants include sodium dodecyl sulfate, sodium tetradecyl sulfate, sodium pentadecyl sulfate, sodium octyl sulfate, sodium oleate, sodium laurate and potassium stearate.

A colorant may also be used in the toner. The colorant is not especially limited, and a known colorant may be used.

The content of the colorant is preferably from 3.0 to 15.0 mass parts per 100 mass parts of the binder resin or polymerizable monomer.

A charge control agent may be used in the toner during toner manufacture. Known charge control agents may be used. The added amount of these is preferably from 0.01 to 10.00 mass parts per 100 mass parts of the binder resin or polymerizable monomer.

The toner particle may also be used as is as a toner. Various organic or inorganic powders may also be added externally to the toner particle as necessary. From the standpoint of durability when added to the toner particle, these organic or inorganic powders preferably have particle diameters that are not more than 1/10 the weight-average particle diameter of the toner particle.

Examples of organic or inorganic powders include the following for example.

(1) Flowability-imparting agents: silica, alumina, titanium oxide, carbon black and carbon fluoride.

(2) Abrasives: metal oxides (such as strontium titanate, cerium oxide, alumina, magnesium oxide, chromium oxide), nitrides (such as silicon nitride), carbides (such as silicon carbide), and metal salts (such as calcium sulfate, barium sulfate and calcium carbonate).

(3) Lubricants: fluorine resin powders (such as vinylidene fluoride and polytetrafluoroethylene) and fatty acid metal salts (such as zinc stearate and calcium stearate).

(4) Charge control particles: metal oxides (such as tin oxide, titanium oxide, zinc oxide, silica and alumina) and carbon black.

An organic or inorganic powder may also be surface treated in order to improve toner flowability or give the toner particles a uniform charge. Examples of treatment agents for hydrophobically treating the organic or inorganic powder include unmodified silicone varnish, various modified silicone varnishes, unmodified silicone oil, various modified silicone oils, silane compounds, silane coupling agents, other organosilicon compounds and organic titanium compounds. These treatment agents may be used alone or in combination.

Various measurement methods associated with the present invention are explained.

Methods for Measuring Volume-Based Median Diameter (Dv50), Number-Based Median Diameter (Dn50) and Particle Distribution of Toner Particle The volume-based median diameter (Dv50), number-based median diameter (Dn50) of the toner particle are calculated as follows.

A Multisizer 3 Coulter Counter(R) (Beckman Coulter, Inc) precision particle size analyzer based on the pore electrical resistance method and equipped with a 100 μm aperture tube is used as the measurement apparatus. The dedicated software included with the apparatus (Beckman Coulter Multisizer 3 Version 3.51, Beckman Coulter, Inc) is used for setting the measurement conditions and analyzing the measurement data. Measurement is performed with 25,000 effective measurement channels.

The electrolyte solution used for measurement is a solution of special grade sodium chloride dissolved in deionized water to a concentration of about 1 mass %, such as "ISOTON II" (Beckman Coulter, Inc.).

The following settings are performed on the dedicated software prior to measurement and analysis.

On the "Change standard measurement method (SOMME)" screen of the dedicated software, the total count number in control mode is set to 50,000 particles, the number of measurements to 1, and the Kd value to a value obtained using "Standard 10.0 μm particles" (Beckman Coulter, Inc.). The threshold and noise level are set automatically by pressing the "Threshold/Noise level measurement" button. The current is set to 1600 μA, the gain to 2 and the electrolyte solution to ISOTON II, and a check is entered for "Aperture tube flush after measurement".

On the "Pulse to particle size conversion setting" screen of the dedicated software, the bin interval is set to the logarithmic particle size, the number of particle size bins is set to 256, and the particle size range is set to the range of 2 μm to 60 μm.

The specific measurement methods are as follows.

(1) About 200 mL of the electrolyte solution is placed in a glass 250 mL round-bottomed beaker dedicated to the Multisizer 3, the beaker is set in the sample stand, and the solution is stirred with a stirrer rod counter-clockwise at a rate of 24 rotations per second. Dirt and bubbles in the aperture tube are then removed by the "Aperture tube flush" function of the dedicated software.

(2) About 30 mL of the electrolyte solution is placed in a 100 mL flat-bottomed glass beaker. About 0.3 mL of a diluted solution of "Contaminon N" (a 10 mass % aqueous solution of a neutral detergent for washing precision measuring instruments, containing a nonionic surfactant, an anionic surfactant, and an organic builder and having a pH of 7, Wako Pure Chemical Industries, Ltd.) diluted about 3× by mass with deionized water is added thereto as a dispersant.

(3) An ultrasonic disperser (Ultrasonic Dispersion System Tetra 150, Nikkaki Bios Co., Ltd.) with an electrical output of 120 W equipped with two built-in oscillators (oscillating frequency 50 kHz) with their phases displaced 180° from each other is prepared. About 3.3 liters of deionized water are placed to the water tank of the ultrasonic disperser, and about 2 mL of Contaminon N are added to this tank.

(4) The beaker of (2) above is set in the beaker fixing hole of the ultrasonic disperser, and the ultrasonic disperser is operated. The height position of the beaker is then adjusted so as to maximize the resonance state of the surface of the electrolyte solution in the beaker.

(5) The electrolyte solution in the beaker of (4) above is exposed to ultrasound as about 10 mg of the toner particle is added little by little to the electrolyte solution, and dispersed. Ultrasound dispersion is then continued for a further 60 seconds. During ultrasound dispersion, the water temperature inside the water tank is adjusted appropriately so as to be from 10° C. to 40° C.

(6) Using a pipette, the electrolyte solution of (5) above with the toner particle dispersed therein is dropped into the round-bottomed beaker of (1) above set in the sample stand, to adjust the measurement concentration to about 5%. Measurement is then performed until the number of measured particles is 50,000.

(7) The measurement data are analyzed using the dedicated software included with the apparatus, and the volume-based median diameter (Dv50) and number-based median diameter (Dn50) are calculated.

The particle distribution is indicated by the ratio of Dv50 to Dn50 (Dv50/Dn50), and the closer this ratio is to 1.00, the sharper the particle size distribution.

Method for Calculating Solubility Parameter (SP Value)

The SP value is determined using the Fedors formula (4). The evaporation energies and molar volumes (25° C.) of the atoms and atomic groups given in Tables 3 to 9 of "Basic Science of Coatings", pages 54 to 57, 1986 (Maki Shoten) can be consulted for the values of $\Delta ei$ and $\Delta vi$ in the formula.

$$\delta i = [Ev/V]^{1/2} [\Delta ei/\Delta vi]^{1/2} \quad (4)$$

Ev: Evaporation energy
V: Molar volume
$\Delta ei$: Evaporation energy of atom or atomic group of component i
$\Delta vi$: Molar volume of atom or atomic group of component i For example, hexanediol is composed of the atomic groups (—OH)×2+(—CH$_2$)×6, and its calculated SP value is determined by the following formula.

$$\delta i = [\Delta ei/\Delta vi]^{1/2} = [\{(5220)\times 2+(1180)\times 6\}/\{(13)\times 2+(16.1)\times 6\}]^{1/2}$$

The resulting SP value ($\delta i$) is 11.95. The SP value is given in units of (cal/cm$^3$)$^{1/2}$.

Measuring SP Value of Organosilicon Polymer Particle from Toner

Once the structure of the organosilicon polymer has been determined by NMR as described below, the SP value of the organosilicon polymer can be determined by the same method from the results.

Method for measuring location of organosilicon polymer particle as measured by cross-sectional observation of the toner particle by scanning electron transmission microscopy (STEM)

Cross-sectional observation of the toner particle is performed as follows.

As a specific method of observing the toner particle in cross-section, the toner is first thoroughly dispersed in a room temperature curable epoxy resin, and cured for two days in a 40° C. atmosphere. A flaky sample is cut out from the obtained cured product using a microtome which is provided with a diamond blade. This sample is magnified 10,000 to 100,000 times with a scanning electron transmission microscope (STEM)(JEM 2800, JEOL Ltd.), and a toner particle cross-section is observed.

Using the difference between the atomic weights of the atoms in the organosilicon compound and the resin used in the toner, these are confirmed based on the fact that the contrast is brighter the greater the atomic weight. Furthermore, ruthenium tetroxide staining and osmium tetroxide staining may also be used to provide contrast between materials.

To accurately determine the location of the organosilicon polymer particle, a bright field image of the toner particle cross-section is obtained with a FEI Co. electron microscope (Tecnai TF20XT) at an acceleration voltage of 200 kV. Next, an EF mapping image of the Si—K edge (99 eV) is obtained by the Three Window method using a Gif Tridiem EELS detector (Gatan, Inc.), and the presence of organosilicon polymer particles in the region extending up to 80% of the distance A from the centroid out of the total distance A from the centroid of the toner particle cross-section to the contour of the cross-section is confirmed.

To distinguish the organosilicon polymer particle from silica, an EF mapping image is also obtained for oxygen, and the two are distinguished based on the difference in brightness.

Method for Determining Range of Organosilicon Polymer Particle

The following measurements are performed using commercial image analysis software such as WinROOF (MITANI CORPORATION).

It is thought that the organosilicon polymer particle is dispersed uniformly in three dimensions in the toner particle, so even if the organosilicon polymer particle is contained in the interior of the toner particle, individual particles are unlikely to be observed in a randomly cut cross-section. For this reason, the range of the organosilicon polymer particle is determined by the following methods.

Line segments are drawn from the centroid of the toner particle cross-section passing through organosilicon polymer particles to the contour of the toner particle cross-section, and the lengths L from the centroid to each organosilicon polymer particle are all measured. The length L at the position closest to the centroid is measured for each organosilicon polymer particle. The ratio of the length L to the length of the line segment (distance A) is given as X %. In one toner particle cross-section, X % is calculated for all observed organosilicon polymer particles.

100 particles are observed, and the smallest value out of all the measured X % values is given as Xmin. If Xmin is not more than 80, the measured sample is judged to be a toner particle in which the organosilicon polymer particle is present in the region extending up to 80% of the distance A from the centroid out of the total distance A from the centroid of the toner particle cross-section to the contour of the cross-section.

Xmin is preferably about 0% to 70%, or more preferably about 1% to 50%.

Method for confirming structure represented by formula (1)

The structure represented by formula (1) in the organosilicon polymer particle contained in the toner particle is confirmed by the following method.

The presence or absence of the alkyl group represented by $R^1$ in formula (1) is confirmed by $^{13}$C-NMR. The detailed structure of formula (1) is confirmed by $^1$H-NMR, $^{13}$C-NMR and $^{29}$Si-NMR. The apparatus and measurement conditions are shown below.

Measurement conditions
Apparatus: Bruker Corporation. AVANCE III 500
Probe: 4 mm MAS BB/1H
Measurement temperature: Room temperature
Sample rotation: 6 kHz
Sample: 150 mg of measurement sample (tetrahydrofuran (THF)-insoluble component of toner particle for NMR measurement) is placed in sample tube 4 mm in diameter.

In this method, the presence or absence of the alkyl group represented by $R^1$ in formula (1) is detected. If a signal is detected, the structure of formula (1) is judged to be "present".

Measurement conditions for (solid) $^{13}$C-NMR
Measurement nuclear frequency: 125.77 MHz
Standard substance: Glycine (external standard: 176.03 ppm)
Observation width: 37.88 kHz
Measurement method: CP/MAS
Contact time: 1.75 ms
Repeat time: 4 s
Cumulative number: 2048 times
LB value: 50 Hz (Solid) $^{29}$Si-NMR measurement method
Measurement conditions
Apparatus: Bruker Corporation. AVANCE III 500
Probe: 4 mm MAS BB/1H
Measurement temperature: Room temperature
Sample rotation: 6 kHz
Sample: 150 mg of measurement sample (THF-insoluble component of toner particle for NMR measurement) is placed in sample tube 4 mm in diameter.
Measurement nuclear frequency: 99.36 MHz
Standard substance: DSS (external standard: 1.534 ppm)
Observation width: 29.76 kHz
Measurement method: DD/MAS, CP/MAS
$^{29}$Si 90° pulse width: 4.00 μs@-1 dB
Contact time: 1.75 ms to 10 ms
Repeat time: 30 s (DD/MAS), 10 s (CP/MAS)
Cumulative number: 2048 times
LB value: 50 Hz Method for Separating External Additive With a toner comprising an external additive added to a toner particle, the external additive is removed before using the toner particle as a sample. The specific methods are as follows.

160 g of sucrose (Kishida Chemical Co., Ltd.) is added to 100 mL of deioinized water and dissolved in a hot water bath to prepare a concentrated sucrose stock solution. 31 g of this concentrated sucrose stock solution and 6 mL of Contaminon N are placed in a centrifuge tube to prepare a dispersion solution. 1 g of the toner is added to this dispersion solution, and toner clumps are broken up with a spatula or the like.

The centrifuge tube is shaken for 20 minutes under conditions of 350 reciprocations per minute in a shaker (KM Shaker, IWAKI INDUSTRY CO.,LTD). After being shaken, the solution is transferred to a glass tube (50 mL) for a swing rotor and centrifuged for 30 minutes at 3,500 rpm with a centrifuge (H-9R, KOKUSAN Co. Ltd.). After centrifugation the glass tube contains the toner particle in the uppermost layer, while the external additive is present in the aqueous solution of the lower layer, so only the toner particle of the uppermost layer is collected.

When the external additive has not been completely removed, centrifugation is repeated as necessary. Once it has been thoroughly separated, the toner solution is dried and the toner particle is collected.

Method for calculating ratio ST3 of peak area of structure represented by formula T3 (T3 structure)

Methods for Confirming and Assaying T3 Structure, X1 Structure, X2 Structure, X3 Structure and X4 Structure The T3, X1, X2, X3 and X4 structures can be confirmed by the $^1$H-NMR, $^{13}$C-NMR and $^{29}$Si-NMR described under "Methods for confirming structure represented by formula (1)" above.

Following $^{29}$Si-NMR measurement of the THF-insoluble component of the toner, the peaks of the multiple silane components with different substituents and binding groups in the toner particle are separated by curve fitting into an X4 structure represented by the following general formula (X4) in which the number of $O_{1/2}$ bonds with silicon is 4.0, an X3 structure represented by the following general formula (X3) in which the number of $O_{1/2}$ bonds with silicon is 3.0, an X2 structure represented by the following general formula (X2) in which the number of $O_{1/2}$ bonds with silicon is 2.0, an X1 structure represented by the following general formula (X1) in which the number of $O_{1/2}$ bonds with silicon is 1.0, and a T unit structure represented by formula (T3), and the ratio of the area of each peak is calculated.

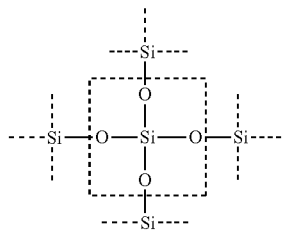

(X4)

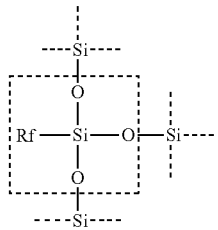

(X3)

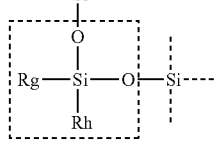

(X2)

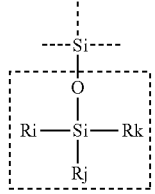

(X1)

Rf, Rg, Rh, Ri, Rj and Rk in the formulae above represent organic groups, halogen atoms, hydroxy groups or alkoxy groups binding to silicon.

Excalibur for Windows(R) version 4.2 (EX series) software for the JEOL Ltd. JNM-EX400 is used for curve fitting. "1D Pro" is clicked from the menu icons to read the measurement data. "Curve fitting function" is then selected from "Command" on the menu bar to perform curve fitting. Peak splitting is performed so as to minimize the peak of the synthetic peak difference (a), which is the difference between the synthetic peak (b) and the measurement peak (d).

The area of the X1 structure, area of the X2 structure, area of the X3 structure and area of the X4 structure are determined, and SX1, SX2, SX3 and SX4 are determined according to the formulae below.

The silane monomers are specified by their chemical shift values, and the sum of the area of the X1 structure, area of the X2 structure, area of the X3 structure and area of the X4 structure obtained by excluding the monomer components from the total peak area in $^{29}$Si-NMR measurement of the THF-insoluble component of the toner particle is given as the total peak area of the organosilicon polymer.

SX1+SX2+SX3+SX4=1.00

SX1={area of X1 structure/(area of X1 structure+area of X2 structure+area of X3 structure+area of X4 structure)}

SX2={area of X2 structure/(area of X1 structure+area of X2 structure+area of X3 structure+area of X4 structure)}

SX3={area of X3 structure/(area of X1 structure+area of X2 structure+area of X3 structure+area of X4 structure)}

SX4={area of X4 structure/(area of X1 structure+area of X2 structure+area of X3 structure+area of X4 structure)}

ST3 is determined by the following formula.

ST3={area of T3 structure/(area of X1 structure+area of X2 structure+area of X3 structure+area of X4 structure)}

The chemical shift values of the silicon in the X1 structure, X2 structure, X3 structure and X4 structure are given below.

Example X1 structure (Ri=Rj=–OC$_2$H$_5$, Rk=–CH$_3$): –47 ppm; example X2 structure (Rg=–OC$_2$H$_5$, Rh=–CH$_3$): –56 ppm; example X3 structure (R=—CH$_2$): –65 ppm.

If an X4 structure is present, the chemical shift value of the silicon is as follows.

X4 structure: –108 ppm

Measuring Content of Organosilicon Polymer

The amount of the organosilicon polymer in the toner particle or toner base particle can be measured by measuring the amount of silicon by fluorescence X-ray.

Measurement of each element by fluorescence X-ray is performed in accordance with JIS K 0119-1969, specifically as follows.

For the measurement equipment, an "Axios" wavelength dispersive X-ray fluorescence spectrometer (Malvern Panalytical Ltd.) is used together with the accessory dedicated "SuperQ ver. 4.0 F" software (Malvern Panalytical Ltd) for setting the measurement conditions and analyzing the measurement data. Rh is used for the anode of the X-ray tube and vacuum as the measurement atmosphere, with a measurement diameter (collimator diameter) of 10 mm and a measurement time of 10 seconds.

Detection is performed using a proportional counter (PC) for measuring light elements and a scintillation counter (SC) for measuring heavy elements.

For the measurement sample, about 1 g of the toner particle or toner base particle is placed in a 10 mm dedicated aluminum ring for pressing, spread flat, and pressed for 60 seconds at 20 MPa with a BRE-32 tablet press (Maekawa Testing Machine MFG Co., LTD) to mold a pellet about 2 mm thick.

Measurement is performed under the above conditions, the elements are identified based on their peak positions in the resulting X-ray, and their concentrations are calculated from the count rate (unit: cps), which is the number of X-ray photons per unit time.

To assay the amount of silicon in the toner particle for example, a silica (SiO$_2$) fine powder for example is added to 0.5 mass parts per 100 mass parts of the toner particle, and thoroughly mixed with a coffee mill. Similarly, silica fine powder is also added to 2.0 mass parts and 5.0 mass parts and mixed with the toner particle, and these are used as samples for a calibration curve.

Pellets of the calibration curve samples are prepared from each sample with a tablet press as described above, and the total count rate (unit: cps) of Si—Kα rays observed at a diffraction angle (2θ) of 109.08° using PET as the dispersive crystal is measured. The acceleration voltage and current value of the X-ray generator in this case are set to 24 kV and 100 mA, respectively. The resulting X-ray count rate is plotted on the vertical axis and the amount of SiO$_2$ added to each calibration curve sample on the horizontal axis to obtain a calibration curve of linear function.

Next, the toner particle for analysis is made into a pellet with a tablet press as described above, and the count rate of Si—Kα rays is measured. The content of the organosilicon polymer in the toner is then determined from the calibration curve.

Method for Confirming Number-Average Particle Diameter of Organosilicon Polymer Particle The number-average particle diameter of the organosilicon polymer particle is measured by scanning electron microscopy (SEM). The method of SEM observation uses images taken with a Hitachi S-4800 ultrahigh resolution field emission scanning electron microscope (Hitachi High-Tech Corporation). The imaging conditions for the S-4800 are as follows.

(1) Sample Preparation

A conductive paste (TED PELLA, Inc., Product No. 16053, PELCO Colloidal Graphite, Isopropanol base) is thinly coated on a sample stand (15 mm×6 mm aluminum sample stand), and the sample is blown onto the paste. Air is then blown to remove excess sample from the sample stand, after which platinum deposition is performed for 15 seconds at 15 mA. The sample stand is set in a sample holder, and the sample stand height is adjusted to 30 mm with a sample height gauge.

(2) Setting S-4800 Observation Conditions

Liquid nitrogen is injected to overflowing into an anti-contamination trap attached to the housing of the S-4800 and left for 30 minutes. "PC-SEM" is operated on the S-4800 to perform flushing (purification of FE chip electron source). The acceleration voltage display part of the control panel on the image is clicked, and the "flushing" button is pressed to open a flushing execution dialog. This is executed after the flushing strength is confirmed to be 2. The emission current from flushing is confirmed to be 20 to 40 μA. The sample holder is inserted into the sample chamber of the S-4800 housing. "Origin" is pressed on the control panel to transfer the sample holder to the observation position.

The acceleration voltage display part is clicked to open an HV setting dialog, and the acceleration voltage is set to "2.0 kV" and the emission current to "10 μA". In the "basic" tab of the operation panel, the signal selection is set to "SE" and "lower (L)" is selected as the SE detector to establish the observation mode for the backscattered electron image. In the same "basic" tab of the operation panel, the probe current of the electronic optical system condition block is set to "Normal", the focus mode to "UHR", and WD to "8.0 mm". The "ON" button of the acceleration voltage display part on the control panel is pressed to apply acceleration voltage.

(3) Focus Adjustment

The magnification is set to 5,000× (5 k) by dragging within the magnification display part of the control panel. The "COARSE" focus knob of the operations panel is turned, and once a certain focus is achieved the aperture alignment is adjusted. "Align" is clicked on the control panel to open an alignment dialog, and "BEAM" is selected. The STIGMA/ALIGNMENT knobs (X, Y) on the operations panel are turned to move the displayed beam to the center of the concentric circles.

"Aperture" is then selected, and the STIGMA/ALIGNMENT knobs (X, Y) are turned one at a time until image movement stops or is minimized. The aperture dialog is closed, and the device is focused with the autofocus. This operation is repeated twice more to focus the device. With the center of the maximum diameter of the observed particle aligned with the center of the measurement screen, the magnification is set to 10,000× (10 k) by dragging within the magnification display part of the control panel. The "COARSE" focus knob of the operations panel is turned, and once a certain focus is achieved the aperture alignment is adjusted. "Alignment" is clicked on the control panel to open an alignment dialog, and "BEAM" is selected. The STIGMA/ALIGNMENT knobs (X, Y) on the operation panel are turned to move the displayed beam to the center of the concentric circles.

"Aperture" is then selected, and the STIGMA/ALIGNMENT knobs (X, Y) are turned one at a time until image movement stops or is minimized. The aperture dialog is closed, and the device is focused with the autofocus. The magnification is then set to 100,000× (100 k), the focus is adjusted as before using the focus knob and STIGMA/ALIGNMENT knobs, and the device is focused again in autofocus. These operations are repeated again to focus the device.

(4) Image Storage

Brightness is adjusted in ABC mode, and photographs 640×480 pixels in size are taken and stored.

The number-average diameter (D1) of 500 particles of the organosilicon polymer particle is calculated with the image processing software (Image J) from the resulting SEM images. The measurement methods are as follows.

Measuring Organosilicon Polymer Particle

The maximum length of the selected shape is selected from the measurement commands, and the particle diameter of the organosilicon polymer particle is measured. This operation is performed multiple times, and the average value of 500 particles is determined to calculate the number-average particle diameter of the organosilicon polymer particle.

Measuring Number-average Particle Diameter of Organosilicon Polymer Particle in Toner The number-average particle diameter of the organosilicon polymer particle in the toner is determined by cross-sectional observation of the toner particle using a scanning transmission electron microscope (STEM).

The sample can be obtained as in the method for measuring the location of the organosilicon polymer particle by cross-sectional observation of the toner particle using a scanning electron transmission microscope (STEM).

For example, images can be obtained with a STEM probe size of 1 nm and an image size of 1024×1024 pixels. Images are also obtained with the Contrast adjusted to 1425 and the Brightness to 3750 in the bright field image Detector Control panel and the Contrast adjusted to 0.0, the Brightness to 0.5 and the Gamma to 1.00 in the Image Control panel. With an image magnification of 100,000×, each of the organosilicon polymer particles in the toner particle cross-section is subjected to image processing to determine the particle diameter.

In detail, the resulting images are subjected to image analysis using image processing software (Image J, available from https://imagej.nih.gov/ij/) to measure the long diameters of each of the organosilicon polymer particles. Image analysis is performed on 30 STEM images, and the number average of the observed long diameters is calculated.

EXAMPLES

The present invention is explained in detail below using examples and comparative examples, but the present invention is not limited to these. Unless otherwise specified, "parts" in the formulations below are based on mass.

Manufacturing Example of Organosilicon Polymer Particle 1

In a 25° C. water bath, 800 mass parts of an aqueous hydrochloric acid solution adjusted to pH 3.0 were prepared in a vessel equipped with a stirrer and a nitrogen pipe. 100 parts of methyl triethoxysilane were added thereto and stirred for 120 minutes to obtain a methyl triethoxysilane hydrolysis solution.

Meanwhile, 1620 parts of water were placed in a vessel equipped with a stirrer and heated to 70° C. in a warm bath, after which a 1.0 mol/L sodium hydroxide solution was added to adjust the pH to 9.0. The above hydrolysis solution was added to this over the course of 1 hour, and the temperature was maintained at 70° C. for 1 hour to perform condensation polymerization. A 0.1 mol/L sodium hydroxide solution was then added gradually to adjust the pH to 10.5, after which condensation polymerization was performed for a further 3 hours at 70° C. to obtain a dispersion of an organosilicon polymer particle 1.

The resulting dispersion of the organosilicon polymer particle 1 was subjected to a centrifugation step to remove coarse particles, and then filtered, washed and dried to obtain an organosilicon polymer particle 1.

The organosilicon polymer particle 1 had a number-average particle diameter of 40 nm. The [ST3] was 0.81.

The organosilicon polymer particle 1 is shown in Table 1.

Manufacturing Examples of Organosilicon Polymer Particles 2 to 7

Organosilicon polymer particles 2 to 7 were obtained as in the manufacturing example of the organosilicon polymer particle 1 but with the changes shown in Table 1 below.

TABLE 1

| | Organosilicon compound | | First reaction | | | | Second reaction | | | Analysis results | |
|---|---|---|---|---|---|---|---|---|---|---|---|
| | Type | Sps after condensation polymerization | Reaction temperature | Reaction pH | Hydrolysis solution addition time | Reaction time | Reaction temperature | Reaction pH | Reaction time | Number-average particle diameter | ST3 |
| Organosilicon polymer particle 1 | MTES | 8.94 | 70° C. | 9.0 | 1.0 hours | 1.0 hours | 70° C. | 10.5 | 3 hours | 40 nm | 0.81 |
| Organosilicon polymer particle 2 | MTES | 8.94 | 85° C. | 9.0 | 0.25 hours | 1.75 hours | 85° C. | 10.5 | 3 hours | 25 nm | 0.88 |
| Organosilicon polymer particle 3 | MTES | 8.94 | 70° C. | 5.5 | 1.0 hours | 1.0 hours | 70° C. | 10.5 | 3 hours | 80 nm | 0.82 |
| Organosilicon polymer particle 4 | MTES | 8.94 | 55° C. | 5.5 | 1.0 hours | 1.0 hours | 70° C. | 10.5 | 3 hours | 120 nm | 0.85 |
| Organosilicon polymer particle 5 | MTES | 8.94 | 55° C. | 5.5 | 1.5 hours | 0.5 hours | 70° C. | 10.5 | 3 hours | 180 nm | 0.88 |
| Organosilicon polymer particle 6 | PrTMS | 8.77 | 70° C. | 5.5 | 1.0 hours | 1.0 hours | 70° C. | 10.5 | 3 hours | 130 nm | 0.61 |
| Organosilicon polymer particle 7 | PrTMS | 8.77 | 70° C. | 5.5 | 1.0 hours | 1.0 hours | 70° C. | 9.0 | 3 hours | 140 nm | 0.51 |

The abbreviations in the table are defined as follows.
MTES: Methyl triethoxysilane
PrTMS: Propyl trimethoxysilane Toner particle 1 manufacturing method
Aqueous Medium 1 Preparation Step 14.0 parts of sodium phosphate (Rasa Industries, LTD 12-hydrate) were added to 650.0 parts of deionized water in a reaction vessel equipped with a stirrer, a thermometer and a reflux pipe, and the system was purged with nitrogen as the temperature was maintained at 65° C. for 1.0 hours.

This was stirred at 15,000 rpm with a T.K. Mixer (Tokushu Kika Kogyo) as a calcium chloride aqueous solution of 9.2 parts of calcium chloride (dihydrate) dissolved in 10.0 parts of deionized water was added all at once to prepare an aqueous medium containing a dispersion stabilizer. 10 mass % hydrochloric acid was further added to the aqueous medium to adjust the pH to 5.0 and obtain an aqueous medium 1.

Polymerizable Monomer Composition Preparation Step

| Styrene | 25.0 parts |
|---|---|
| C.I. pigment blue 15:3 | 5.0 parts |

These materials were placed in an attritor (Mitsui Miike Kakoki K.K), and dispersed for 5.0 hours at 220 rpm with zirconia particles 1.7 mm in diameter to prepare a pigment dispersion. The following materials were added to the resulting pigment dispersion.
Styrene: 43.0 parts
n-butyl acrylate: 28.0 parts
Saturated polyester resin: 4.0 parts
(Polycondensate of propylene oxide modified bisphenol A (2-mol adduct) and terephthalic acid (molar ratio 10:12), glass transition temperature Tg=68° C., weight-average molecular weight Mw=12,000, molecular weight distribution Mw/Mn=5.12)
Fischer-Tropsch wax (melting point 78° C.): 8.0 parts
Organosilicon polymer particle 1: 0.2 parts These were warmed to 65° C. and dissolved and dispersed uniformly at 500 rpm with a T.K. Homomixer (Tokushu Kika Kogyo) to prepare a polymerizable monomer composition.

Granulation Step

With the temperature of the aqueous medium 1 maintained at 70° C. and the rotation of the T.K. Homomixer at 15,000 rpm, the polymerizable monomer composition was added to the aqueous medium 1, and 10.0 parts of t-butyl peroxypivalate were added as a polymerization initiator. This was then granulated for ten minutes as is in the stirring apparatus with the rotation maintained at 15,000 rpm.

Polymerization and Distillation Step

Following the granulation step, the stirrer was replaced with a propeller stirring blade and polymerization was performed for 5.0 hours under stirring at 150 rpm with the temperature maintained at 70° C., after which the temperature was raised to 85° C. and a polymerization reaction was performed by heating for 2.0 hours.

The reflux pipe of the reaction vessel was then replaced with a cooling pipe, and the slurry was heated to 100° C. and distilled for 6 hours to remove unreacted polymerizable monomers and obtain a toner base particle dispersion of the toner particle 1.

Part of the toner base particle dispersion of the toner particle 1 was filtered, washed and dried, and when the content of the organosilicon polymer and the "ST3" of the organosilicon polymer particle in the THF-insoluble component of the toner base particle were confirmed, the content of the organosilicon polymer was 0.17 mass % and the "ST3" was 0.81.

Polymerizing Organosilicon Compound on Toner Particle Surface 60.0 parts of deionized water was measured into a reaction vessel equipped with a stirrer and a thermometer, and the pH was adjusted to 4.0 with 10 mass % hydrochloric acid. This was heated under stirring, to a temperature of 40° C. 40.0 parts of the organosilicon compound methyl triethoxysilane were then added, and hydrolyzed by stirring for at least two hours. Completion of hydrolysis was confirmed visually when the oil and water formed one phase without separating, at which point the mixture was cooled to obtain a hydrolysate of the organosilicon compound.

The temperature of the obtained colorant particle dispersion was cooled to 55° C., and 25.0 parts of the hydrolysate of the organosilicon compound were added to initiate polymerization of the organosilicon compound. This was maintained as is for 15 minutes, after which the pH was adjusted to 5.5 with a 3.0 mass % sodium hydrogen carbonate aqueous solution. This was maintained for 60 minutes with continued stirring at 55° C., after which the pH was adjusted to 9.5 with a 3.0 mass % aqueous sodium hydrogen carbonate solution, and the mixture was maintained for a further 240 minutes to obtain a toner particle dispersion.

Washing and Drying Step

After completion of the polymerization step, the toner particle dispersion was cooled, hydrochloric acid was added to adjust the pH of the toner particle dispersion to not more than 1.5, and this was left under stirring for 1 hour and subjected to solid-liquid separation by pressure filtration to obtain a toner cake. The was re-slurried with deionized water to once again obtain a dispersion, which was subjected to solid-liquid separation in the same filter unit to obtain a toner cake.

The resulting toner cake was dried for 72 hours in a thermostatic tank at 40° C. and classified to obtain a toner particle 1.

The content of the organosilicon polymer in the resulting toner particle 1 was 3.66 mass %, and the [ST3] was 0.78.

The presence of organosilicon polymer particles was also confirmed in the range of 1% to 100% of the distance from the centroid to the contour of the toner particle 1 cross-section. The presence of the organosilicon polymer on the surface of the toner particle 1 was also confirmed. The numbers 1% to 100% indicating the presence of the organic silicon polymer particles include the organosilicon polymer on the toner particle surface.

The toner particle 1 is shown in Table 2.

Methods for Manufacturing Toner Particles 2 to 4

The toner particles 2 to 4 were manufactured by changing the toner particle 1 manufacturing method as shown in Table 2. The physical properties and the like are shown in Table 2.

Methods for Manufacturing Toner Particles 5 to 9

The toner particles 5 to 9 were manufactured by changing the toner particle 1 manufacturing method as shown in Table 2, except that the organosilicon polymer was not polymerized on the toner particle surface. The physical properties and the like are shown in Table 2.

Method for manufacturing toner particle 10
Binder resin

| | |
|---|---|
| Styrene-acrylic resin 1 (75:25 styrene: n-butyl acrylate copolymer, weight average molecular weight = 30,000, SPb = 9.81) | 44.0 parts |
| Styrene-acrylic resin 2 (75:25:0.3 styrene: n-butyl acrylate: 1,6-hexanediol diacrylate copolymer, weight average molecular weight = 98,000, SPb =9.81) | 32.0 parts |
| Saturated polyester resin (Polycondensate of propylene oxide modified bisphenol A (2-mol adduct) and terephthalic acid (molar ratio 10:12), glass transition temperature Tg = 68° C., weight-average molecular weight Mw = 12,000, molecular weight distribution Mw/Mn = 5.12) | 4.0 parts |
| C.I. pigment blue 15:3 | 5.0 parts |
| Organosilicon polymer particle 3 | 0.5 parts |

The materials of this formulation were thoroughly mixed in a Henschel mixer, and then kneaded in a twin-screw kneader set to 130° C. The kneaded product was cooled and coarsely crushed to 2 mm or less in a hammer mill to obtain a coarsely crushed product.

The resulting coarsely crushed product was medium crushed with a Hosokawa Micron Group ACM10 to a weight-average particle diameter of 100 μm and the resulting medium crushed product was pulverized with a mechanical pulverizer (Turbo Industries Turbomill T250-RS). The resulting pulverized product was then subjected to coarse grain classification with a Hosokawa Micron Turboplex 100 ATP to obtain a toner particle 10. The toner particle 10 is shown in Table 2.

Methods for manufacturing toner particles 11 to 17 and comparative toner particle 1.

The toner particles 11 to 17 and comparative toner particle 1 were manufactured by changing the toner 10 manufacturing method as shown in Table 2. The physical properties and the like are shown in Table 2.

Methods for Manufacturing Comparative Toner Particles 2 to 4

The comparative toner particles 2 to 4 were manufactured as in the manufacturing example of the toner particle 10 except that pearl necklace silica (Nissan Chemical Corporation SNOWTEX(R) PS) was used instead of the organosilicon polymer particle 1 as shown in Table 2. The physical properties and the like are shown in Table 2.

Method for Manufacturing Toner Particle 18
Preparing Styrene-Acrylic Resin 1 Dispersion

| | |
|---|---|
| Styrene-acrylic resin 1 | 44 parts |
| Deionized water | 56 parts |

These materials were placed in a stainless-steel vessel, heat melted to 95° C. in a warm bath, and thoroughly stirred at 7,800 rpm with a homogenizer (IKA ULTRA-TURRAX T50) as 0.1 mol/L sodium hydrogen carbonate was added to raise the pH above 7.0. A mixed solution of 1 part of sodium dodecylbenzene sulfonate and 119 parts of deionized water was then dripped in gradually and to perform emulsification and dispersion and obtain a styrene-acrylic resin 1 dispersion.

When the particle size distribution of this styrene-acrylic resin 1 dispersion was measured with a particle size analyzer (HORIBA, Ltd. LA-950), the number-average particle diameter was 0.22 μm, and no coarse particles larger than 1 μm were observed.

Preparing styrene-acrylic resin 3 dispersion

| | |
|---|---|
| Styrene-acrylic resin 3 (75:25:0.3 styrene: n-butyl acrylate: 1,6-hexanediol diacrylate copolymer, weight-average molecular weight = 38,000, SPb = 9.81) | 44 parts |
| Deionized water | 56 parts |

These materials were placed in a stainless-steel vessel, heat melted to 95° C. in a warm bath, and thoroughly stirred at 7,800 rpm with a homogenizer (IKAULTRA-TURRAX T50) as 0.1 mol/L sodium hydrogen carbonate was added to raise the pH above 7.0. A mixed solution of 1 part of sodium dodecylbenzene sulfonate and 119 parts of deionized water was then dripped in gradually to perform emulsification and dispersion and obtain a styrene-acrylic resin 3 dispersion.

When the particle size distribution of this styrene-acrylic resin 3 dispersion was measured with a particle size analyzer (HORIBA, Ltd. LA-950), the number-average particle diameter was 0.29 μm, and no coarse particles larger than 1 μm were observed.

Preparing Saturated Polyester Resin Dispersion

| | |
|---|---|
| Saturated polyester resin | 44 parts |
| (Polycondensate of propylene oxide modified bisphenol A (2-mol adduct) and terephthalic acid (molar ratio 10:12), glass transition temperature Tg = 68° C., weight-average molecular weight Mw = 12,000, molecular weight distribution Mw/Mn = 5.12) | |
| Deionized water | 56 parts |

These materials were placed in a stainless-steel vessel, heat melted to 95° C. in a warm bath, and thoroughly stirred at 7,800 rpm with a homogenizer (IKA ULTRA-TURRAX T50) as 0.1 mol/L sodium hydrogen carbonate was added to raise the pH above 7.0. A mixed solution of 1 part of sodium dodecylbenzene sulfonate and 119 parts of deionized water was then dripped in gradually to perform emulsification and dispersion and obtain a saturated polyester resin dispersion.

When the particle size distribution of this saturated polyester resin dispersion was measured with a particle size analyzer (HORIBA, Ltd. LA-950), the number-average particle diameter was 0.25 µm, and no coarse particles larger than 1 µm were observed.

Preparing Release Agent Particle Dispersion

| | |
|---|---|
| Fischer-Tropsch wax (melting point 78° C.) | 44 parts |
| Deionized water | 56 parts |

These materials were placed in a stainless-steel vessel, heat melted to 95° C. in a warm bath, and thoroughly stirred at 7,800 rpm with a homogenizer (IKA ULTRA-TURRAX T50) as 0.1 mol/L sodium hydrogen carbonate was added to raise the pH above 7.0. A mixed solution of 1 part of sodium dodecylbenzene sulfonate and 119 parts of deionized water was then dripped in gradually to perform emulsification and dispersion and obtain a release agent particle dispersion 1.

When the particle size distribution of this release agent particle dispersion was measured with a particle size analyzer (HORIBA, Ltd. LA-950), the number-average particle diameter was 0.23 µm, and no coarse particles larger than 1 µm were observed.

Preparing Colorant Particle Dispersion

| | |
|---|---|
| C.I. pigment blue 15:3 | 44 parts |
| Sodium dodecylbenzene sulfonate | 3 parts |
| Deionized water | 393 parts |

These were mixed and dispersed with a sand grinder mill. When the particle size distribution of this colorant particle dispersion was measured with a particle size analyzer (HORIBA, Ltd. LA-950), the number-average particle diameter was 0.28 µm, and no coarse particles larger than 1 µm were observed.

Preparing Organosilicon Polymer Particle 1 Dispersion

| | |
|---|---|
| Organosilicon polymer particle 1 | 10 parts |
| Sodium dodecylbenzene sulfonate | 2 parts |
| Deionized water | 88 parts |

These were mixed, placed in a vessel containing 200 parts of zirconia beads 0.2 mm in diameter in a ball mill, and dispersed for 6 hours to prepare an organosilicon polymer particle 1 dispersion First Aggregation Step

| | |
|---|---|
| Styrene-acrylic resin 1 dispersion | 120 parts |
| Styrene-acrylic resin 3 dispersion | 120 parts |
| Release agent particle dispersion | 20 parts |
| Colorant particle dispersion | 25 parts |
| Organosilicon polymer particle 1 dispersion | 15 parts |
| Sodium dodecylbenzene sulfonate | 0.5 parts |

These materials were placed in a reactor (1-liter flask, anchor impeller with baffle) and uniformly mixed to obtain a mixed dispersion. The resulting mixed dispersion was heated to 60° C. in a warm bath and then maintained at that temperature. A 0.5 mass % aluminum sulfate aqueous solution was dripped in slowly as the particle size was measured, and dripping was continued until the number-average particle diameter reached 5.0 to 5.5 µm to obtain a first aggregate dispersion for obtaining a toner particle 18. The number-average particle diameter of the first aggregate dispersion of the toner particle 18 was 5.4 µm Second Aggregation Step

| | |
|---|---|
| Styrene-acrylic resin 1 dispersion | 120 parts |
| Styrene-acrylic resin 3 dispersion | 120 parts |
| Release agent particle dispersion | 20 parts |
| Colorant particle dispersion | 25 parts |
| Sodium dodecylbenzene sulfonate | 0.5 parts |

These materials were placed in a 500 mL beaker and thoroughly stirred with a stirrer until uniform to obtain a mixed dispersion. The resulting mixed dispersion was added to the above first aggregate dispersion of the toner particle 18, and a 0.5 mass % aluminum sulfate aqueous solution was again dripped in slowly as the particle size was measured. Dripping was continued until the number-average particle size reached 6.5 to 7.0 µm, to obtain a second aggregate dispersion for obtaining a toner particle 18. The number-average particle diameter of the second aggregate dispersion of the toner particle 18 was 6.8 µm.

Third Aggregation Step 20 parts of the saturated polyester resin dispersion were added to the second aggregate dispersion of the toner particle 18 and thoroughly stirred, after which 10.0 parts of a 0.5 mass % aluminum sulfate aqueous solution were again dripped in slowly to obtain a third aggregate dispersion of the toner particle 18. The number-average particle diameter of the third aggregate dispersion of the toner particle 18 was 7.0 µm.

Fusing and Aging Step

The vessel containing the third aggregate dispersion of the toner particle 18 was purged with nitrogen, and maintained for 1 hour at 60° C. This was then heated at 0.5° C./min and maintained at 90° C. for 30 minutes. The temperature was then lowered to 63° C. and maintained for 3 hours. These reactions were performed in a nitrogen atmosphere. After a predetermined amount of time, this was cooled to room temperature at a cooling rate of 0.5° C. per minute.

Filtration and Drying Step

After cooling, the reaction product was subjected to solid-liquid separation under 0.4 MPa of pressure in a 10-liter pressure filtration unit to obtain a toner cake. Deionized water was then added until the pressure filtration unit was full, and the cake was washed under 0.4 MPa of pressure. Washing was performed again for a total of three washings.

This was re-slurried with deionized water to again obtain a dispersion, which was subjected to solid-liquid separation in the same filtration unit to obtain a toner cake.

The resulting toner particle 18 had a number-average particle diameter of 7.0 μm.

The resulting toner cake was dried for 72 hours in a 40° C. thermostatic tank and classified to obtain a toner particle 18.

The resulting toner particle 18 had an organosilicon polymer content of 1.20 mass % and a [ST3] of 0.81.

Furthermore, the organosilicon polymer was confirmed to be present in the range of 1% to 75% of the distance from the centroid to the contour of the toner particle 18 cross-section.

The toner particle 18 is shown in Table 2.

Manufacturing Example of Comparative Toner Particle 5

Each dispersion was prepared as in the manufacturing example of the toner particle 18.

A comparative toner particle 5 was obtained in the same way as the toner particle 18 except that the materials used in the first aggregation step and second aggregation step were changed as follows.

First Aggregation Step

| | |
|---|---|
| Styrene-acrylic resin 1 dispersion | 144 parts |
| Styrene-acrylic resin 3 dispersion | 144 parts |
| Release agent particle dispersion | 24 parts |
| Colorant particle dispersion | 30 parts |
| Sodium dodecylbenzene sulfonate | 0.5 parts |

Second Aggregation Step

| | |
|---|---|
| Styrene-acrylic resin 1 dispersion | 96 parts |
| Styrene-acrylic resin 3 dispersion | 96 parts |
| Release agent particle dispersion | 16 parts |
| Colorant particle dispersion | 20 parts |
| Organosilicon polymer particle 1 dispersion | 15 parts |
| Sodium dodecylbenzene sulfonate | 0.5 parts |

The resulting first aggregate dispersion of the comparative toner particle 5 had a number-average particle diameter of 5.7 μm, the second aggregate dispersion of the toner particle 5 had a number-average particle diameter of 6.8 μm, the third aggregate dispersion of the toner particle 5 had a number-average particle diameter of 7.1 μm and the comparative toner particle 5 had a number-average particle diameter of 7.0 μm.

The resulting comparative toner particle 5 had an organosilicon polymer content of 1.21 mass % and a [ST3] of 0.81.

Furthermore, the organosilicon polymer was confirmed to be present in the range of 85% to 95% of the distance from the centroid to the contour of the toner particle 5 cross-section.

The comparative toner particle 5 is shown in Table 2.

TABLE 2

| Toner particle No. | Manufacturing method | Binder resin Spb | Filler particle Type | Filler particle Added parts | Toner particle properties: Range of organosilicon polymer | Toner particle properties: Amount of organosilicon polymer | ST3 | |Sps-Spb| | Toner base particle: Amount of organosilicon polymer particle | ST3 |
|---|---|---|---|---|---|---|---|---|---|---|
| 1 | Suspension polymerization | 9.81 | Organosilicon polymer particle1 | 0.2 | 1 to 100% | 3.66% | 0.78 | 0.87 | 0.17% | 0.81 |
| 2 | Suspension polymerization | 9.81 | Organosilicon polymer particle1 | 0.1 | 1 to 100% | 3.53% | 0.79 | 0.87 | 0.08% | 0.81 |
| 3 | Suspension polymerization | 9.81 | Organosilicon polymer particle1 | 1.0 | 1 to 100% | 4.21% | 0.78 | 0.87 | 0.85% | 0.81 |
| 4 | Suspension polymerization | 9.81 | Organosilicon polymer particle1 | 1.5 | 1 to 100% | 4.85% | 0.80 | 0.87 | 1.20% | 0.81 |
| 5 | Suspension polymerization | 9.81 | Organosilicon polymer particle1 | 0.2 | 1 to 98% | 0.17% | 0.81 | 0.87 | — | — |
| 6 | Suspension polymerization | 9.81 | Organosilicon polymer particle1 | 0.1 | 1 to 98% | 0.08% | 0.81 | 0.87 | — | — |
| 7 | Suspension polymerization | 9.81 | Organosilicon polymer particle1 | 0.5 | 1 to 98% | 0.43% | 0.81 | 0.87 | — | — |
| 8 | Suspension polymerization | 9.81 | Organosilicon polymer particle1 | 1.0 | 1 to 98% | 0.85% | 0.81 | 0.87 | — | — |
| 9 | Suspension polymerization | 9.81 | Organosilicon polymer particle2 | 1.5 | 1 to 98% | 1.20% | 0.88 | 0.87 | — | — |
| 10 | Melt kneading pulverization | 9.81 | Organosilicon polymer particle3 | 0.5 | 1 to 100% | 0.44% | 0.82 | 0.87 | — | — |
| 11 | Melt kneading pulverization | 9.81 | Organosilicon polymer particle4 | 0.5 | 1 to 100% | 0.44% | 0.85 | 0.87 | — | — |

TABLE 2-continued

| Toner particle No. | Manufacturing method | Binder resin Spb | Filler particle Type | Added parts | Toner particle properties Range of organo-silicon polymer | Amount of organo-silicon polymer | ST3 | \|Sps-Spb\| | Toner base particle Amount of organo-silicon polymer particle | ST3 |
|---|---|---|---|---|---|---|---|---|---|---|
| 12 | Melt kneading pulverization | 9.81 | Organosilicon polymer particle5 | 0.5 | 1 to 100% | 0.43% | 0.88 | 0.87 | — | — |
| 13 | Melt kneading pulverization | 9.81 | Organosilicon polymer particle1 | 0.2 | 1 to 100% | 0.17% | 0.81 | 0.87 | — | — |
| 14 | Melt kneading pulverization | 9.81 | Organosilicon polymer particle1 | 0.1 | 1 to 100% | 0.08% | 0.81 | 0.87 | — | — |
| 15 | Melt kneading pulverization | 9.81 | Organosilicon polymer particle1 | 1.5 | 1 to 100% | 1.21% | 0.81 | 0.87 | — | — |
| 16 | Melt kneading pulverization | 9.81 | Organosilicon polymer particle6 | 0.5 | 1 to 100% | 0.39% | 0.61 | 1.04 | — | — |
| 17 | Melt kneading pulverization | 9.81 | Organosilicon polymer particle7 | 0.5 | 1 to 100% | 0.40% | 0.51 | 1.04 | — | — |
| 18 | Emulsion aggregation | 9.81 | Organosilicon polymer particle1 | 0.5 | 1 to 75% | 1.20% | 0.81 | 0.87 | — | — |
| Comparative particle 1 | Melt kneading pulverization | 9.81 | — | — | 0% | 0% | — | — | — | — |
| Comparative particle 2 | Melt kneading pulverization | 9.81 | Pearl necklace silica | 0.5 | 1 to 100% | 0.44% | 0 | 8.00 | — | — |
| Comparative particle 3 | Melt kneading pulverization | 9.81 | Pearl necklace silica | 1.5 | 1 to 100% | 1.22% | 0 | 8.00 | — | — |
| Comparative particle 4 | Melt kneading pulverization | 9.81 | Pearl necklace silica | 5.0 | 1 to 100% | 4.43% | 0 | 8.00 | — | — |
| Comparative particle 5 | Emulsion aggregation | 9.81 | Organosilicon polymer particle1 | 1.5 | 85 to 95% | 1.21% | 0.81 | 0.87 | 0% | — |

In the table, "range of organosilicon polymer" indicates the range in which the organosilicon polymer is present out of the distance A from the centroid of the toner particle cross-section to the contour of the cross-section. The "amount of organosilicon polymer" and "amount of organosilicon polymer particle" are given in mass %.

Examples 1 to 18 and Comparative Examples 1 to 5

The toner particles 1 to 4 were used as is as the toners of Examples 1 to 4. For the toner particles 5 to 18 and the comparative toner particles 1 to 5, 1.0 part of a silica fine particle with a number-average particle diameter of 40 nm of the primary particles was added per 100.0 parts of each toner particle, and mixed with an FM Mixer (Nippon Coke & Engineering) to obtain the toners of Examples 5 to 18 and Comparative Examples 1 to 5.

The properties of the resulting toners were evaluated by the following methods. Evaluation of low temperature fixability 200 g of toner was left for 24 hours in an environment of 15° C., 10% RH, and an image evaluation was performed at 15° C., 10% RH using an LBP-7700C (Canon Inc.) as the evaluation apparatus.

A color laser printer (HP Color LaserJet 3525dn, Hewlett Packard Development LP) was prepared with the fixing unit removed, and the toner was removed from the cyan cartridge, which was then filled with the toner for evaluation.

An unfixed toner image (toner laid-on level 0.9 mg/cm$^2$) 2.0 cm long and 15.0 cm wide was formed on image receiving paper (HP Laser Jet 90, Hewlett Packard Company, 90 g/m$^2$) in a part 1.0 cm from the upper edge in the direction of paper feed.

The removed fixing unit was then modified so that the fixing temperature and process speed could be adjusted, and used to perform a fixing test of the unfixed image.

First, with the process speed set to 280 m/s in a normal-temperature, normal-humidity environment (23° C., 60% RH), the temperature was raised in 2° C. increments from an initial temperature of 120° C., and the unfixed image was fixed at each temperature.

The evaluation standard for low temperature fixability is as follow.

The low temperature fixing initiation point is the lowest temperature at which no low temperature offset (adhesion of part of toner to fixing unit) is observed.

Evaluation Standard

A: Low temperature fixing initiation point less than 155° C.
B: Low temperature fixing initiation point 155° C. to less than 165° C.
C: Low temperature fixing initiation point 165° C. to less than 175° C.
D: Low temperature fixing initiation point at least 175° C.

Evaluation of Developing Member Contamination

The toner was removed from a new cyan cartridge, and the developing roller was also removed. The developing roller was then removed from the cartridge used for the low temperature fixing evaluation and attached to this cartridge.

The LBP main unit was also modified so that image output was possible even if the cartridge was not filled with toner. This created a state in which the toner coated on the developing roller was repeatedly rubbed by the developing blade.

Toner rubbing on the developing member corresponding to 100 sheets of printing was then performed with this cartridge, and the toner on the developing member was removed. This developing member was taped and pasted onto A4 color laser copy paper (Canon Inc. 80 g/m²).

The color density was measured at 5 locations on the tape, and the average value was taken as an indicator of member contamination. Colorimetry was performed using a 504 spectrum densitometer (X-Rite Inc.) to measure image density, which was evaluated given 0.00 as the value without developing roller taping.

Evaluation Standard
A: Less than 0.050 density difference from standard
B: 0.050 to less than 0.100 density difference from standard
C: 0.100 to less than 0.200 density difference from standard
D: At least 0.200 density difference from standard The toner evaluation results are shown in Table 3.

TABLE 3

|  |  | Low temperature fixability evaluation | | Member contamination evaluation | |
| --- | --- | --- | --- | --- | --- |
|  |  | Result | Rank | Result | Rank |
| Example 1 | Toner particle 1 | 154 | A | 0.012 | A |
| Example 2 | Toner particle 2 | 152 | A | 0.022 | A |
| Example 3 | Toner particle 3 | 156 | B | 0.004 | A |
| Example 4 | Toner particle 4 | 160 | B | 0.002 | A |
| Example 5 | Toner particle 5 | 150 | A | 0.072 | B |
| Example 6 | Toner particle 6 | 146 | A | 0.106 | C |
| Example 7 | Toner particle 7 | 152 | A | 0.054 | B |
| Example 8 | Toner particle 8 | 156 | B | 0.048 | A |
| Example 9 | Toner particle 9 | 164 | B | 0.044 | A |
| Example 10 | Toner particle 10 | 148 | A | 0.114 | C |
| Example 11 | Toner particle 11 | 146 | A | 0.136 | C |
| Example 12 | Toner particle 12 | 146 | A | 0.176 | C |
| Example 13 | Toner particle 13 | 142 | A | 0.136 | C |
| Example 14 | Toner particle 14 | 140 | A | 0.176 | C |
| Example 15 | Toner particle 15 | 150 | A | 0.088 | B |
| Example 16 | Toner particle 16 | 156 | B | 0.124 | C |
| Example 17 | Toner particle 17 | 154 | A | 0.136 | C |
| Example 18 | Toner particle 18 | 150 | A | 0.104 | C |
| Comparative Example 1 | Comparative toner particle 1 | 140 | A | 0.384 | D |
| Comparative Example 2 | Comparative toner particle 2 | 154 | A | 0.302 | D |
| Comparative Example 3 | Comparative toner particle 3 | 166 | C | 0.244 | D |
| Comparative Example 4 | Comparative toner particle 4 | 176 | D | 0.228 | D |
| Comparative Example 5 | Comparative toner particle 5 | 152 | A | 0.216 | D |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-156504, filed Aug. 29, 2019, which is hereby incorporated by reference herein in its entirety.

What is claimed is:

1. A toner, comprising:
a toner particle that contains a binder resin and an organosilicon polymer;
the organosilicon polymer comprising an organosilicon polymer particle having a particle diameter of 10-200 nm, the organosilicon polymer particle having a structure represented by formula (1)

$$R^1\text{—}SiO_{3/2} \qquad (1)$$

where $R^1$ is a $C_{1-4}$ alkyl group, wherein a ratio of a peak area of the structure represented by formula (1) to a total peak area of the organosilicon polymer in $^{29}$Si-NMR measurement of a tetrahydrofuran-insoluble component of the toner particle is 0.60 to 0.90, the organosilicon polymer particle is contained in the tetrahydrofuran-insoluble component, and the organosilicon polymer particle is present in a region extending up to 80% of distance A from the centroid of the toner particle cross-section in cross-sectional observation of the toner particle by transmission electron microscopy, where A is the distance from the centroid to the cross-section contour.

2. The toner according to claim 1, wherein the content of the organosilicon polymer is 0.05 to 5.00 mass % of the toner particle.

3. The toner according to claim 1, wherein |SPb−SPs|≤1.0 when SPb is the SP value of the binder resin and SPs is the SP value of the organosilicon polymer particle.

4. The toner according to claim 1, wherein the toner particle comprises the organosilicon polymer on the toner particle surface.

5. The toner according to claim 1, wherein the toner particle comprises an organosilicon polymer having a structure represented by formula (1) on its surface.

6. The toner according to claim 1, wherein the content of the organosilicon polymer particle is 0.05 to 1.50 mass % of the toner particle.

7. The toner according to claim 1, wherein $R^1$ is a $C_{1-2}$ alkyl group.

* * * * *